United States Patent
Meiyappan Kannappan et al.

(10) Patent No.: US 12,487,805 B1
(45) Date of Patent: Dec. 2, 2025

(54) MULTI-LEVEL MULTI-DEPLOYMENT SOFTWARE MODEL

(71) Applicant: Juniper Networks, Inc., Sunnyvale, CA (US)

(72) Inventors: Arul Meiyappan Kannappan, Ottawa (CA); Tejas Sanjeev Panse, San Jose, CA (US); Arun Vithal Mahajan, Palo Alto, CA (US); Harsha Hulageri, Bengaluru (IN); Shivin Gopalani, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 190 days.

(21) Appl. No.: 18/498,584

(22) Filed: Oct. 31, 2023

(51) Int. Cl.
*G06F 9/46* (2006.01)
*G06F 8/35* (2018.01)
*G06F 8/60* (2018.01)
*G06F 8/65* (2018.01)
*G06F 9/44* (2018.01)
*G06F 9/50* (2006.01)
*G06F 15/177* (2006.01)
*H04L 12/24* (2006.01)

(52) U.S. Cl.
CPC .............. *G06F 8/60* (2013.01); *G06F 9/5027* (2013.01)

(58) Field of Classification Search
CPC ......... G06F 8/60; G06F 9/5027; H04L 45/66; H04L 12/4633; H04L 45/586; H04L 12/4641; H04L 45/74; H04L 61/5014
See application file for complete search history.

(56) References Cited

U.S. PATENT DOCUMENTS 11,074,165 B2 * 7/2021 Khakare .............. G06F 11/3684
11,977,919 B2 * 5/2024 Paquette ............... G06F 9/5072

OTHER PUBLICATIONS

Lam, "AWS and Kubecost Collaborate to Deliver Cost Monitoring for EKScustomers," https://aws.amazon.com/blogs/containers/aws-and-kubecost-collaborate-to-deliver-cost-monitoring-for-eks-customers/, Aug. 25, 2022, 5 pp.

* cited by examiner

*Primary Examiner* — Thuy Dao
(74) *Attorney, Agent, or Firm* — Shumaker & Sieffert, P.A.

(57) ABSTRACT

A method comprising: receiving a request for a new stack that is to comprise a plurality of components at a plurality of levels of the new stack, wherein the request indicates the supporting components; in response to the request: interacting with a cloud services provider to provision instances of the components of the new stack, wherein at least one the instances of the components of the new stack is included in another stack hosted by the cloud services provider; generating configuration mapping data that relate the instances of the components of the other stack with the new stack; converting the configuration mapping data to one or more cloud provider-specific models that are specific to the cloud services provider; and deploying the new stack at the cloud-services provider for use by the first user based on the one or more cloud provider-specific models.

20 Claims, 5 Drawing Sheets

MULTI-LEVEL MULTI-DEPLOYMENT SOFTWARE MODEL

TECHNICAL FIELD

The disclosure relates to models for development, testing, and deployment of software.

BACKGROUND

In general, software stacks are sets of interrelated components that operate together to form a software product. Components of a software stack may be grouped into sets of services, such as Infrastructure as a Service (IaaS), Platform as a Service (PaaS), Software as a Service (SaaS), and so on. Software stacks may be hosted by cloud services providers.

During development of a software product, individual developers may use separate copies of the software stack for the software product. For instance, a first developer working on developing a first component of the software product may use a first copy of a software stack, a second developer working on developing a second component of the software product may use a second copy of the software stack, and so on. Furthermore, for each user, there may be different copies of the software stack for different stages of a software development lifecycle (SDLC), such as a development stack, a quality assurance (QA) stack, a staging stack, and a production stack. A development stack is a software stack in which a developer initially develops and refines a software component, such as a software service or module. A QA stack is a software stack in which software components are tested, e.g., using manual or automated testing techniques. A staging stack includes versions of the software components that have been tested and are ready for use in the production stack. The production stack provides the software product to customers.

In general, cloud services providers charge based on the number of stacks provided to a customer. Since there may be multiple stacks provided to multiple developers, the number of stacks provided by a cloud service provider, and associated costs to the customer, may increase quickly. Alternatively, sharing software stacks among multiple developers can reduce the number of software stacks hosted by the cloud services provider, but can lead to scenarios where the multiple developers have their code overwritten or are unable to test their versions of their code independently of other developers.

Deployment is a process in which software components in one stack are merged into another stack. For example, a software component in a staging stack may be deployed to a production stack. Continuous integration and continuous deployment (CI/CD) is a software development paradigm in which developers develop software components, test the software components for quality assurance, and then merge the tested software components into the production stack of the software product on an incremental basis. The CI/CD paradigm stands in contrast to traditional software development paradigms in which updates to a software product are infrequently released in as large integrated packages. The CI/CD paradigm may allow for incremental improvements and addition of features. This may enable a development team to implement a DevOps working environment in which development and operations maintenance form to continuous feedback loop.

SUMMARY

In general, this disclosure describes techniques for automating deployment of software components. As described herein, a Deployment as a Service (DaaS) service is introduced that automates deployment of a stack while allowing reuse of services and/or components that already support other stacks, while also allowing individual users to use stacks independently of other users without their updates being overwritten. Additionally, the techniques of this disclosure allow for isolation of different layers of a software stack, such as an Infrastructure as a Service (Iaas) layer, Platform as a Service (PaaS) layer, and Software as a Service (SaaS) layer. In this context, isolation refers to non-interaction between stacks. Thus, data or actions from one stack do not effect another stack, even if the stacks share common components.

In an example, this disclosure describes a method comprising: receiving, by a computing system, a request for a new stack that is to comprise a plurality of components at a plurality of levels of the new stack, wherein the request indicates the components; in response to receiving the request: interacting, by the computing system, with a cloud services provider to provision instances of the components of the new stack, wherein at least one of the instances of the components of the new stack is included in one or more existing stacks hosted by the cloud services provider; generating, by the computing system, configuration mapping data that relate the instances of the components of the other stack with the new stack; converting, by the computing system, the configuration mapping data to one or more cloud provider-specific models that are specific to the cloud services provider; and deploying, by the computing system, the new stack at the cloud-services provider based on the one or more cloud provider-specific models such that the new stack is operationally isolated from the other stack.

In another example, this disclosure describes a computing system comprising: one or more processors configured to: receive a request for a new stack that is to comprise a plurality of components at a plurality of levels of the new stack, wherein the request indicates the components; and in response to the request: interact with a cloud services provider to provision instances of the components of the new stack, wherein at least one of the instances of the components of the new stack is included in one or more existing stacks hosted by the cloud services provider; generate configuration mapping data that relate the instances of the components of the other stack with the new stack; convert the configuration mapping data to one or more cloud provider-specific models that are specific to the cloud services provider; and deploy the new stack at the cloud-services provider based on the one or more cloud provider-specific models such that the new stack is operationally isolated from the other stack.

The details of one or more examples are set forth in the accompanying drawings and the description below. Other features, objects, and advantages will be apparent from the description and drawings, and from the claims.

BRIEF DESCRIPTION OF DRAWINGS

Like reference characters denote like elements throughout the text and figures.

DETAILED DESCRIPTION

Components within stacks may be underutilized. For example, specific components may be common across software stacks and not frequently updated. Such components may include logging and monitoring services. Reuse of such components within multiple software stacks may increase resource utilization and may therefore reduce costs incurred to customers of cloud services providers. However, there has not traditionally been a way to automate deployment of components in such a way that stacks can reuse components while maintaining the separation of different stacks for different users, for different stages of the software development lifecycle (SDLC), and for different software products.

This disclosure describes a multi-level multi-deployment (MLMD) model for software deployment. For example, the MLMD model may be used for deployment of components of software products, including updated and upgraded components), or other software components to various environments, such as development, testing, staging, and production. The term "multi-level" in MLMD refers to the ability to deploy software components to multiple levels of a software stack, such as an IaaS level, a PaaS level, a SaaS level, and an application level. The term "multi-deployment" in MLMD refers to the ability to deploy software components across multiple software stacks, such as a development stack, quality assurance (QA) stack, staging stack, and production stack. Use of the MLMD model may increase reuse of components, which may conserve storage space and processor resources, and therefore reduce costs.

Figure 1:
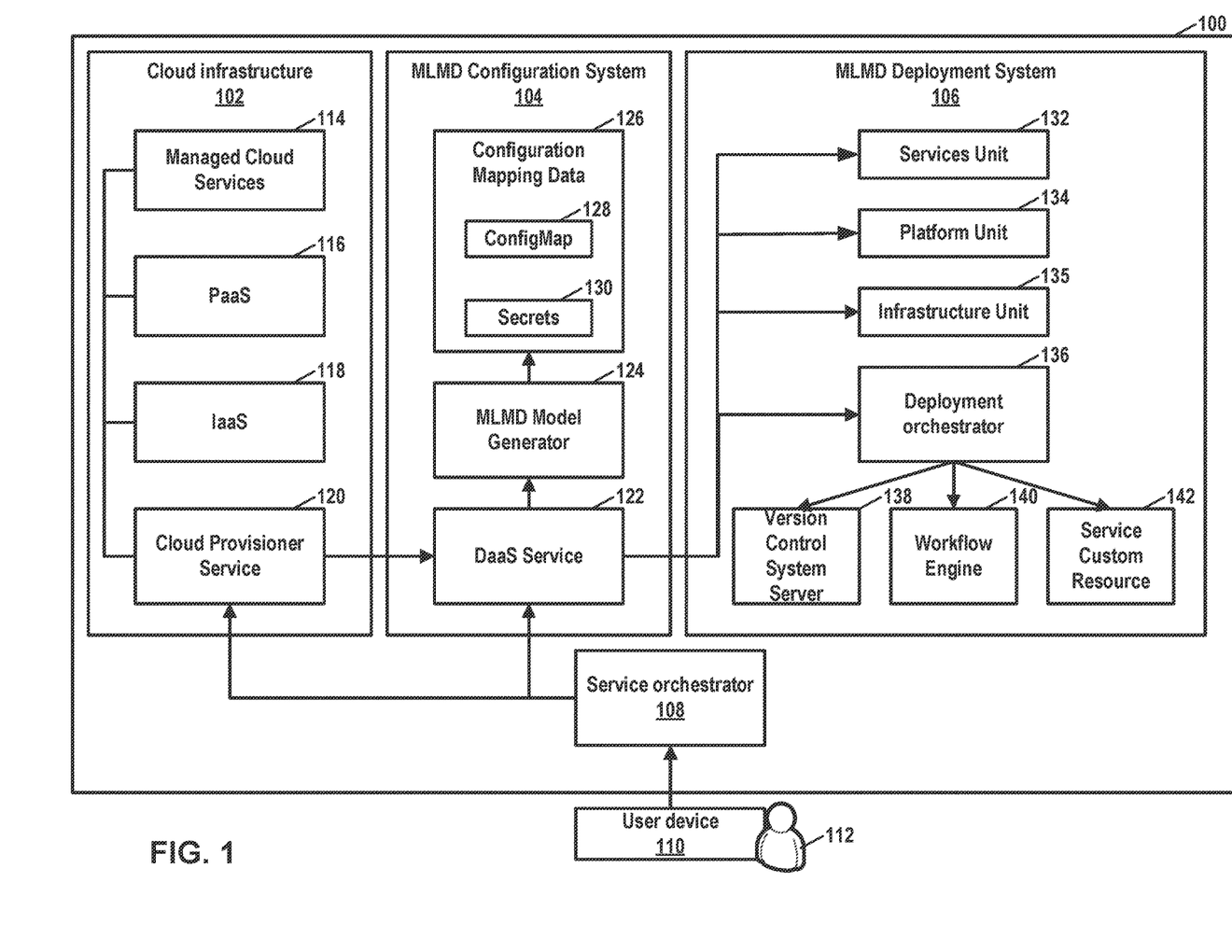
FIG. 1 is a block diagram illustrating an example system for deploying software stacks, in accordance with techniques of this disclosure.

FIG. 1 is a block diagram illustrating an example computing system 100 for deploying software stack, in accordance with techniques of this disclosure. Computing system 100 may be implemented by one or more computing devices, such as server devices. In the example of FIG. 1, computing system 100 includes a cloud infrastructure 102, a Multi-Level Multi-Deployment (MLMD) configuration system 104, a MLMD deployment system 106, and a service orchestrator 108. In other examples, computing system 100 may include other systems and components.

There may be multiple stacks for each developer and each stage of a software development lifecycle (SDLC). A "stack" may be a set of interrelated components that interoperate to support the execution of an application. Example components may include hardware components (e.g., processors, data storage systems, memory units, network interfaces, etc.), hypervisor components, operating system components, middleware components (e.g., monitoring components, logging components, database components, software libraries), and application components (e.g., software components that are specific to an individual application). The term Infrastructure as a Service (IaaS) may apply to low-level components of a stack, such as hardware components and hypervisor components. The term Platform as a Service (PaaS) may apply to software components of a stack that provide a platform for running higher-level components of the stack. Example software components that may be provided as PaaS may include operating system components, middleware components, and database management systems. The term Software as a Service (SaaS) may apply to components of a stack that run on a platform. Example software components that may be provided as SaaS may include application components. Some or all components of a stack may be provided by a cloud services provider. Example cloud services providers may include Amazon Web Services (AWS)™, Google Cloud™, Microsoft AZURE™, and others.

The middleware components may include monitoring components. Examples of monitoring components may include GRAFANA, from Graphana Labs, and PROMETHEUS. Monitoring components may monitor memory leakage, memory usage, central processing unit (CPU) utilization, and provide other information on a stack-by-stack basis.

When using a MLMD model, service orchestrator 108 receives a request from a user device 110 for a new stack. A user 112, such as a software developer, may use user device 110. Examples of user device 110 may include personal computers, laptop computers, workstations, or other types of devices that may be used by users. The new stack may be a stack for a new software product, a stack for an existing software product for use specifically by user 112, a stack for an existing software product for a specific stage of a software development lifecycle, or for other purposes. The request may specify which components will be specific to the new software product or will be specific to user 112. For example, if the request is for a stack for an existing software product and for use specifically by user 112, the request may specify which components user 112 is actively developing.

The request may specify which applications or services are to be deployed in the new stack. For example, the request may specify that the new stack is the include specific software components, such as a specific event streaming platform (e.g., APACHE KAFKA), a specific database system (e.g., PostGreSQL), a container infrastructure, cloud services, monitoring service, a cloud platform, a platform type, and specific application-level microservices. The request may specify uniform resource locators (URLs) from which one or more of the software components may be obtained. In some examples, the request may specify resource requirements for the new stack. The resource requirements may describe minimum amounts of computing resources that are to be used to support the new stack. Example types of resource requirements may include a minimum size of a computing cluster, a minimum number of nodes, minimum memory requirements, minimum bandwidth requirements, and so on. In some examples, the request may include other parameters associated with the new stack, such as a time zone, a type of the new stack (e.g., development, quality assurance, staging, production, etc.), certificate information, and so on. In some examples, the request may include one or more manifest files that specify the requirements of the new stack. One or more of the manifest files may be formatted as YAML files.

In response to the request for a stack, service orchestrator 108 may interact with cloud infrastructure 102 to instantiate the cloud infrastructure and MLMD configuration system 104 to deploy the stack. After the stack is deployed, service orchestrator 108 may provide an indication to user device 110 of how to access the stack. For example, service orchestrator 108 may provide a Uniform Resource Locator (URL) to user device 110. A dynamic password generator of service orchestrator 108 may also assign a password to user 110. User 110 may enter the URL in a browser of user device 110 and may provide a username and the password. User 112 may later change the password. User 110 may then interact with the stack through the browser.

Cloud infrastructure 102 includes infrastructural components provided by a cloud services provider. In the example of FIG. 1, cloud infrastructure 102 includes managed cloud services 114, PaaS components 116, IaaS components 118, and a cloud provisioner service 120. Managed cloud services 114 may include application-level components, microservices, and other components that operate on a platform. Example managed cloud services may include database components, such as one or more database management services that enable access to one or more databases stored at data storage components. PaaS components 116 may include components that provide platform-level services, such as operating system components. IaaS components 118 may include components that the provide infrastructure-level services. For instance, IaaS components 118 may include hardware components, data storage components, hypervisor components, and so on.

In some examples, PaaS components 116 include a container orchestration system (COS). A COS is a platform for managing containerized workloads and services. Kubernetes is an example of a container orchestration system. In the context of a COS, a node is a machine (e.g., a physical machine or a virtual machine) that runs containerized workloads. A COS cluster may be a cluster of nodes. A cluster of nodes is a group of nodes that are managed together by a COS. A node-group is a collection of worker nodes within a cluster. There may be multiple node-groups within a single cluster. The COS may manage auto-scaling within a node-group to bring in or remove components as needed.

Service orchestrator 108 may interact with cloud provisioner service 120 to provision instances of components for a new stack in cloud infrastructure 102. Provisioning a component may involve identifying an existing instance of the component (which may already be in use for an existing stack) or generating a new instance of the component. In examples where the new stack is for a new software product, cloud provisioner service 120 may provision specific IaaS components 118, PaaS components 116, and managed cloud services 114 for the new stack. For instance, cloud provisioner service 120 may provision a new COS cluster (and in some examples, a subnet for the COS cluster) to support containerized software components of the new stack. Thus, cloud provisioner service 120 may establish different clusters for different software products. For different developers of a software product, cloud provisioner service 120 may create different namespaces within a cluster for the software product. In a COS, a namespace provides a mechanism for isolating groups of components within a single cluster. In examples where the new stack is for an individual developer working on an existing software product, cloud provisioner service 120 may provision a new namespace within an existing cluster for the existing software product. Cloud provisioner service 120 may assign different namespaces to individual developers within a single cluster.

In some examples, managed cloud services 114 associated with a software stack may include one or more databases. The databases may include one or more PostGreSQL databases, MySQL databases, or other types of databases. In some examples where the new stack is for a new software application, cloud provisioner service 120 may interact with a database management system (e.g., PETRONI) to initialize a new database. In some examples where the new stack is for an individual developer, cloud provisioner service 120 may interact with a database management system for the database to generate a new schema for the new software stack within the database. This may allow data stored in the database to be isolated for different software stacks.

In some examples, when the database management system generates the new schema, the database management system may generate a new index for the new software stack. The index provides information on how to locate information within the database. Because different software stacks have different indexes, when the database management system receives a request for data in the database from a software component of a specific software stack, the database management system only retrieves information associated with the specific software stack and does not retrieve information in the database associated with other software stacks.

Cloud provisioner service 120 may also provision other services, such as IaaS components 118 and PaaS components 116, for use in the new stack. Provisioning such services may involve identifying existing instances of IaaS components 118 and PaaS components 116. For example, cloud provisioning service 120 may determine, based on one or more requirements specified in the request for the new stack, available components to support the new stack. In general, the components provisioned by cloud provisioner service 120 are components that support a software product but are not specific to the software product. The stack for the software product may also include other components that are specific to the software product.

After cloud provisioner service 120 has provisioned the components in cloud infrastructure 102 (e.g., a cluster, namespace, database schema, etc.), service orchestrator 108 may interact with a Deployment as a Service (DaaS) service 122 of MLMD configuration system 104. In some examples, DaaS service 122 is a COS service, such as a Kubernetes microservice. DaaS service 122 may orchestrate the deployment of the new stack. As part of orchestrating the deployment of the new stack, DaaS service 122 may interact with various other services to deploy the new stack. As part of the process of deploying the new stack, DaaS service 122 may interact with a MLMD model generator 124 to generate and maintain configuration mapping data 126 that map instances of components to individual stacks, such as stacks associated with individual developers, individual software products, and/or stages of the software development lifecycle. The configuration mapping data may map a single software component to multiple software stacks. For example, the configuration mapping data may map a single logging service to multiple software stacks.

Configuration mapping data 126 may map a cluster, namespace, services identified by the cloud provisioner service to the new stack. Additionally, configuration mapping data 126 may map individual software components of the software product to the new stack. For example, configuration mapping data 126 may indicate specific versions of software components that user 112 is developing are associated with the stack for user 112. In this example, configuration mapping data 126 may map these to the namespace associated with user 112.

As briefly indicated above, DaaS service 112 may use a MLMD model generator 124 to generate configuration mapping data 126. MLMD model generator 126 may generate a model stack in every layer. The model stack may be stored in a Kubernetes ConfigMap 128 and/or as Kubernetes secrets data 130. The model stack may include, for example, an API object used to store configuration settings for the stack, connection strings, public credentials, hostnames, URLs, and the configuration mapping data 126. After configuration mapping data 126 is generated for user 112 or a software product, DaaS service 122 may make subsequent modifications to configuration mapping data 126 of the stack without regenerating configuration mapping data 126 for the stack. MLMD model generator 124 provides configuration mapping data 126 back to DaaS service 122.

In at least some examples, the format of configuration mapping data 126 is generic among all stacks and components deployable by DaaS service 122. However, individual cloud services providers may have different formats for receiving instructions regarding stacks. Thus, a cloud services provider may not be able to directly use configuration mapping data 126 to deploy a stack. Accordingly, MLMD deployment system 106 may include units that transform configuration mapping system 126 into custom resource configuration information that is usable by a specific cloud services provider. In the example of FIG. 1, MLMD deployment system 106 includes a services unit 132, a platform unit 134, and an infrastructure unit 135. DaaS service 122 may interact with services unit 132 to generate service-level custom resource configuration information to configure service-level components (e.g., applications, microservices, etc.) of the stack for deployment at a cloud services provider. The service-level custom resource configuration information may include an application manifest file, an infrastructure manifest file, and a dependency file.

DaaS service 122 may interact with platform unit 134 to generate platform-level custom resource configuration information to configure platform-level components of the stack for deployment at the cloud services provider. The platform-level custom resource configuration information may include a cluster name (e.g., Elastic Kubernetes Service (EKS) cluster name), a geographic region of a data center to host the platform services, a node group name, a number of worker nodes in the node group, and so on. Different node groups may be associated with different address sub-nets.

DaaS service 122 may interact with infrastructure unit 135 to generate infrastructure-level custom resource configuration information to configure infrastructure-level components of the stack for deployment at the cloud services provider. The infrastructure-level custom resource configuration information may specify component types, component services (e.g., database names, namespaces), etc. Each of services unit 132, platform unit 134, and infrastructure unit 135 may receive configuration mapping data 126 and transform configuration mapping data 126 into custom resource configuration information.

A deployment orchestrator 136 of MLMD deployment system 106 may orchestrate deployment of a stack based on the custom resource configuration information. Deployment orchestrator 136 may use a version control system (VCS) server 138 and a workflow engine 140 of MLMD deployment system 106 to deploy the stack. VCS server 138 may store software components (e.g., containerized software components), including multiple versions of software components. VSC server 138 may be a GitOps server, such as ArgoCD. VSC server 138 may store software components, such as application-level components, on a version-controlled basis.

Workflow engine 140 organizes tasks in step-by-step procedures, such as the steps in a CI/CD pipeline. Workflow engine 140 may be implemented using Argo. Deployment orchestrator 136 may interact with workflow engine 140 to cause workflow engine 140 to perform tasks to deploy the components of the stack. Deployment orchestrator 136 may initiate the workflow by pushing the custom resource configuration information to VCS server 138.

A service custom resource 142 of MLMD deployment system 106 may store that lower-level, provider-specific custom resource configuration information generated by services unit 132, platform unit 134, and infrastructure unit 135. For example, services unit 132, platform unit 134, and infrastructure unit 135 may translate high-level deployment object (e.g., configuration mapping data 126) into custom resource configuration information that is usable by workflow engine 140, which may be specific to a services provider. For instance, services unit 132, platform unit 134, and infrastructure unit 135 may generate Custom Resource Definitions (CRDs) that define steps in the workflow for workflow engine 140. Deployment orchestrator 136 may reuse at least portions the CRDs later if updates are made to the stack or if the stack is redeployed.

Workflow engine 140 may perform a series of one or more workflow tasks to handle the deployment of components of the stack. In some examples, workflow engine 140 may deploy components of the new stack to establish a tenant-based routing system for inter-component communications between components hosted by a cloud services provider. Inter-component communications may include requests from software components for services provided by other software components and responses to such requests. Each software stack may be regarded as a separate "tenant" of the cloud services provider. Thus, while there may be some components shared among software stacks, there may be different components, such as components for storing application data and state data, that are different for each stack. For instance, there may be different components representing memory or databases for different software stacks. Because inter-component communications are segregated by stack, each of the stacks may act as though they are independent while in fact some components of the stacks may be shared.

For example, user 112 may be developing a new version of a software component. Accordingly, user 112 may request deployment of the new version of the software component into a development stack. The software component may be at any level of the software stack, such as at the IaaS level, PaaS level, SaaS level, or application level. In response, MLMD model generator 124 may generate configuration mapping data 126 defining a new development stack that includes the new version of the software component. The new development stack may include software components also used in other software stacks. DaaS service 122 may use MLMD deployment system 106 to configure a cloud service provider to implement the new development stack. In this way, DaaS service 122 may deploy the new version of the software component to the new development stack. When user 112 has finished development of the new version of the software component, user may request DaaS service 122 to deploy the new version of the software component to a QA stack. In response, DaaS service 122 may again generate configuration mapping data that defines the QA stack to include the new version of the software component. As before, this QA stack may include one or more existing software components that are already included in other software stacks.

As mentioned elsewhere in this disclosure, the middleware components of a stack may include logging services. Such logging services may be shared among stacks, including among stacks for different software products. Elasticsearch, Fluentd, and Kibana (EFK) is a common combination of tools used for log management in Kubernetes environments. Using the techniques of this disclosure, multiple stacks may use the same instances of EFK components, which are configured to index logs into different indexes based on tenant-id. In other examples, logs can also be tagged with tenant-id which allows logically isolation of data within a single index. Therefore, the same single EFK instance may have logs for all software products but since each software product is identified by a tenant-id, searching for the logs in the same EFK stack based on that tenant-id uniquely identifies the logs as belonging to that tenant. Therefore, multiple tenants (and hence multiple applications) may share the same single instance of EFK. A similar approach may be taken for common monitoring solutions. Deployment orchestrator 136 may configure special tagging for the containers that are deployed on the workloads and then group those containers into single entity for getting the logs per products.

Figure 2:
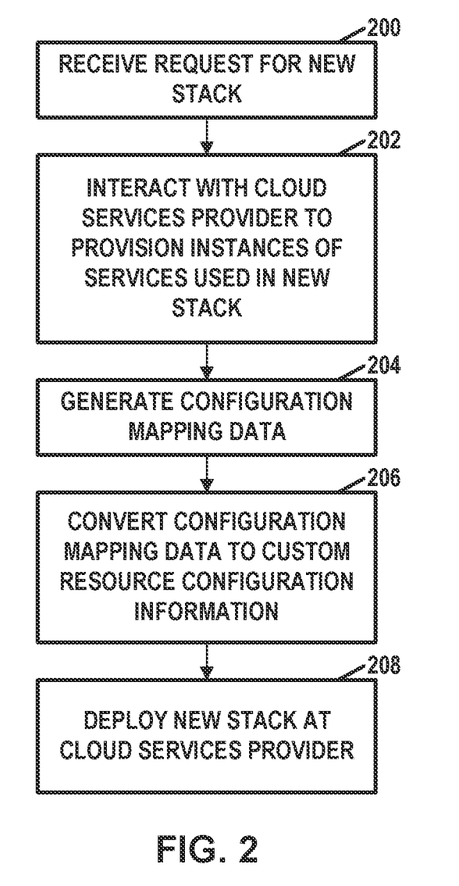
FIG. 2 is a flowchart illustrating an example operation in accordance with techniques of this disclosure.

FIG. 2 is a flowchart illustrating an example operation in accordance with techniques of this disclosure. In the example of FIG. 2, service orchestrator 108 may receive a request for a new stack that is to comprise a plurality of components at a plurality of levels of the new stack (200). The request may indicate the components of the stack. However, the request does not necessarily specify individual instances of the components. The plurality of levels may include two or more of an IaaS level, a PaaS level, and a SaaS level. The request may include Uniform Resource Locator (URL) of locations from which containerized software packages for one or more of the components of the new stack are retrievable. Furthermore, in some instances, the request specifies minimum computing resource requirements of the new stack.

In response to the request, service orchestrator 108 may interact with a cloud services provider (e.g., cloud infrastructure 102) to provision instances of the components of the new stack (202). For instance, service orchestrator 108 may request cloud provisioner service 120 to provision the instances of the components of the new stack. In some examples, at least one of the instances of the components of the new stack is included in another stack hosted by the cloud services provider. The new stack is deployed for use by a first user and the one or more existing stacks are associated with users other than the first user. In other instances, none of the provisioned instances of the components are included in any other stack. In some examples where the request specifies minimum computing resource requirements of the new stack, service orchestrator 108 may interact with the cloud services provider comprises interacting with the cloud services provider to provision a cluster of compute nodes that satisfy the minimum computing resource requirements of the new stack.

In some examples, the components of the new stack include a database and to provision the database, the cloud services provider generates a schema for the new stack within an existing database that also includes a schema for the other stack. In such examples, the configuration mapping data may relate a schema generated by the cloud service provider with the new stack. In some examples, the components of the stack include a cluster of nodes managed by a COS and to provision the cluster of nodes, provisioning the cluster of nodes may cause the cloud services provider to instantiate a new namespace within an existing cluster that hosts one or more components of the new stack. The existing cluster may support multiple stacks for a single software product.

Furthermore, DaaS service 122 may generate configuration mapping data 126 that relate the instances of the components of the other stack with the new stack (204). In some examples, service orchestrator 136 may request a deployment service to generate the configuration mapping data and initiate deployment of the new stack. As discussed elsewhere in this disclosure, DaaS service 122 (i.e., a deployment service) may be hosted by the cloud services provider (e.g., cloud infrastructure 102).

MLMD deployment system 106 (e.g., service unit 132, platform unit 134, infrastructure unit 135, etc.) may convert the configuration mapping data to one or more cloud provider-specific models that are specific to the cloud services provider (206).

MLMD deployment system 106 may deploy the new stack at the cloud-services provider based on the one or more cloud provider-specific models such that the new stack is operationally isolated from the other stack (208). As part of deploying the new stack, deployment orchestrator 136 of MLMD deployment system 106 may invoke a workflow engine 140 that uses the cloud-provider specific models to communicate with the cloud services provider to configure stack-isolated inter-component communication between the components of the new stack.

Figure 3:
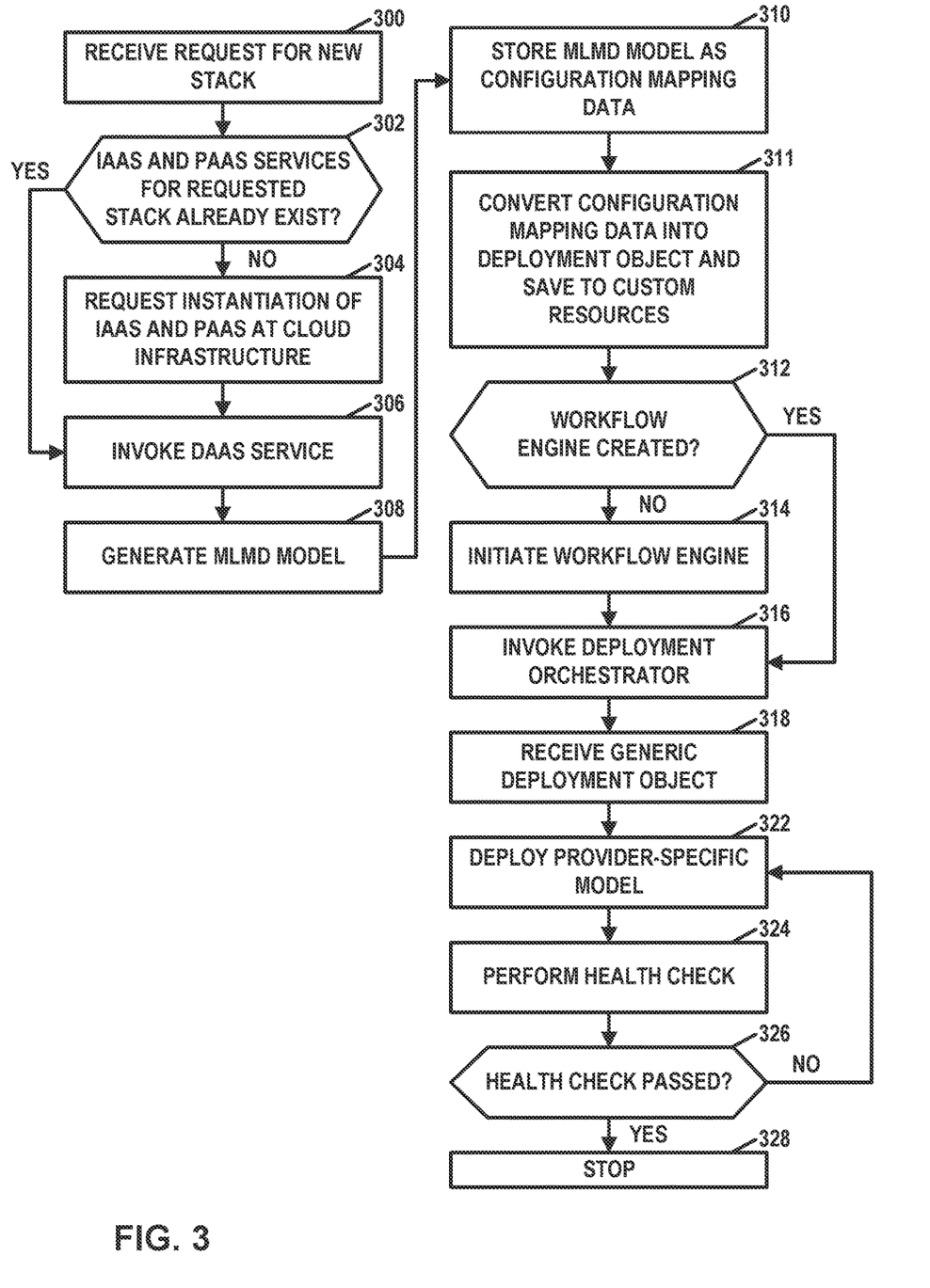
FIG. 3 is a flowchart illustrating an example operation in accordance with techniques of this disclosure.

FIG. 3 is a flowchart illustrating an example operation in accordance with techniques of this disclosure. The operation of FIG. 3 may be an expanded version of the operation of FIG. 2. The example of FIG. 3 is provided as an example. In other instances, more, fewer, or different actions may be performed, or actions may be performed in different orders.

In the example of FIG. 3, service orchestrator 108 may receive a request for a new stack (300). In response, service orchestrator 108 may determine whether IaaS and PaaS services for the requested stack already exist in cloud infrastructure 102 (302). For example, service orchestrator 108 may access one or more interfaces of a cloud services provider to retrieve information indicating which IaaS and PaaS services already exist in cloud infrastructure 102. If the IaaS and PaaS services for the requested stack do not already exist in cloud infrastructure 102 ("NO" branch of 302), service orchestrator 108 may request provisioning of IaaS services, PaaS services, and SaaS services for the requested stack from cloud provisioner service 120 (304). After provisioning of the IaaS and PaaS services for the requested stack or after determining that the IaaS and PaaS services for the requested stack already exist ("YES" branch of 202), service orchestrator 108 may invoke DaaS service 122 (306). For example, DaaS service 122 may provide an Application Programming Interface (API). In this example, service orchestrator 108 may invoke a method of the API of DaaS service 122 to invoke DaaS service 122.

When invoked, DaaS service 122 may generate a MLMD model (308). DaaS service 102 may use MLMD model generator 124 to store the MDML model as configuration mapping data 126 (310). For example, MLMD model generator 124 may store the MDML model as Kubernetes ConfigMap data 128 and/or Secrets data 130. Services unit 132, platform unit 134, and/or infrastructure unit 135 may convert configuration mapping data 126 to a generic deployment object and may save the generic deployment object to custom resources 142 (311). The generic deployment object may include configuration mapping data 126 for the requested stack.

Deployment orchestrator 136 of MLMD deployment system 106 may determine whether workflow engine 140 is already created (312). If workflow engine 140 has not already been created ("NO" branch of 312), deployment orchestrator 136 may create workflow engine 140 (314). After creating workflow engine 140 or after determining that workflow engine 142 has already been created ("YES" branch of 312), deployment orchestrator 136 may receive the generic deployment object (318).

Deployment orchestrator 136 may use the provider-specific models to deploy the requested stack (322). For example, deployment orchestrator 136 may configure workflow engine 140 to perform a series of workflow tasks that configure components of the stack based on the provider-specific models. In some examples, the workflow tasks include retrieving software components from VCS server 138 and copying and/or installing the software components on appropriate devices. In some examples, the workflow tasks include reconfiguring routing information so that requests, responses, and other data are routed in an inter-component messaging system to the correct components.

Furthermore, in the example of FIG. 3, workflow engine 140 may perform a health check on the requested stack (324). When workflow engine 140 performs the health check, workflow engine 140 confirms that the components of the stack are functioning together properly. For instance, workflow engine 140 may confirm that components are able to communicate with each other properly and are generating appropriate output. In some examples, to perform the health check, workflow engine 140 may interrogate components at the lowest level (e.g., an IaaS level), followed by components at progressively higher levels until each component of the stack has been checked. If the requested stack passes the health check ("YES" branch of 324), the process of FIG. 2 may end (328). Otherwise, if the requested stack does not pass the health check ("NO" branch of 326), deployment orchestrator 136 may generate an error notification for review by user 112 or another person.

Figure 4:
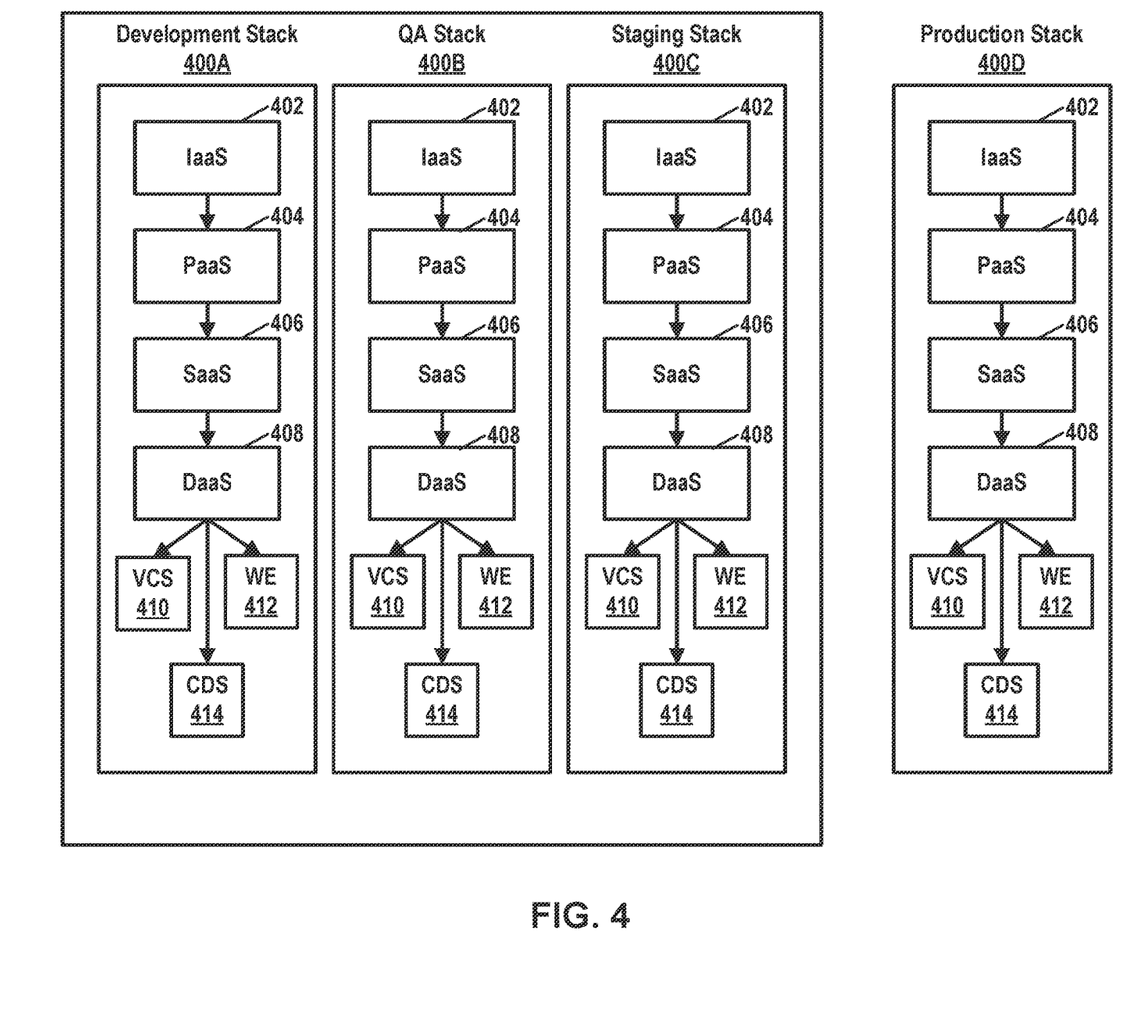
FIG. 4 is a block diagram illustrating example stacks, in accordance with techniques of this disclosure.

FIG. 4 is a block diagram illustrating example stacks, in accordance with techniques of this disclosure. Specifically, FIG. 4 illustrates a development stack 400A, a QA stack 400B, a staging stack 400C, and a production stack 400D, collectively, "stacks 400". Each of stacks 400 includes IaaS services 402, PaaS services 404, SaaS service 406, and a DaaS service 408. DaaS service 408 may use a version control system (VCS) 410, such as Git, a workflow engine (WE) 412, such as Argo, and a continuous deployment system 414, such as ArgoCD, fluxCD, or JenkinX.

Figure 5:
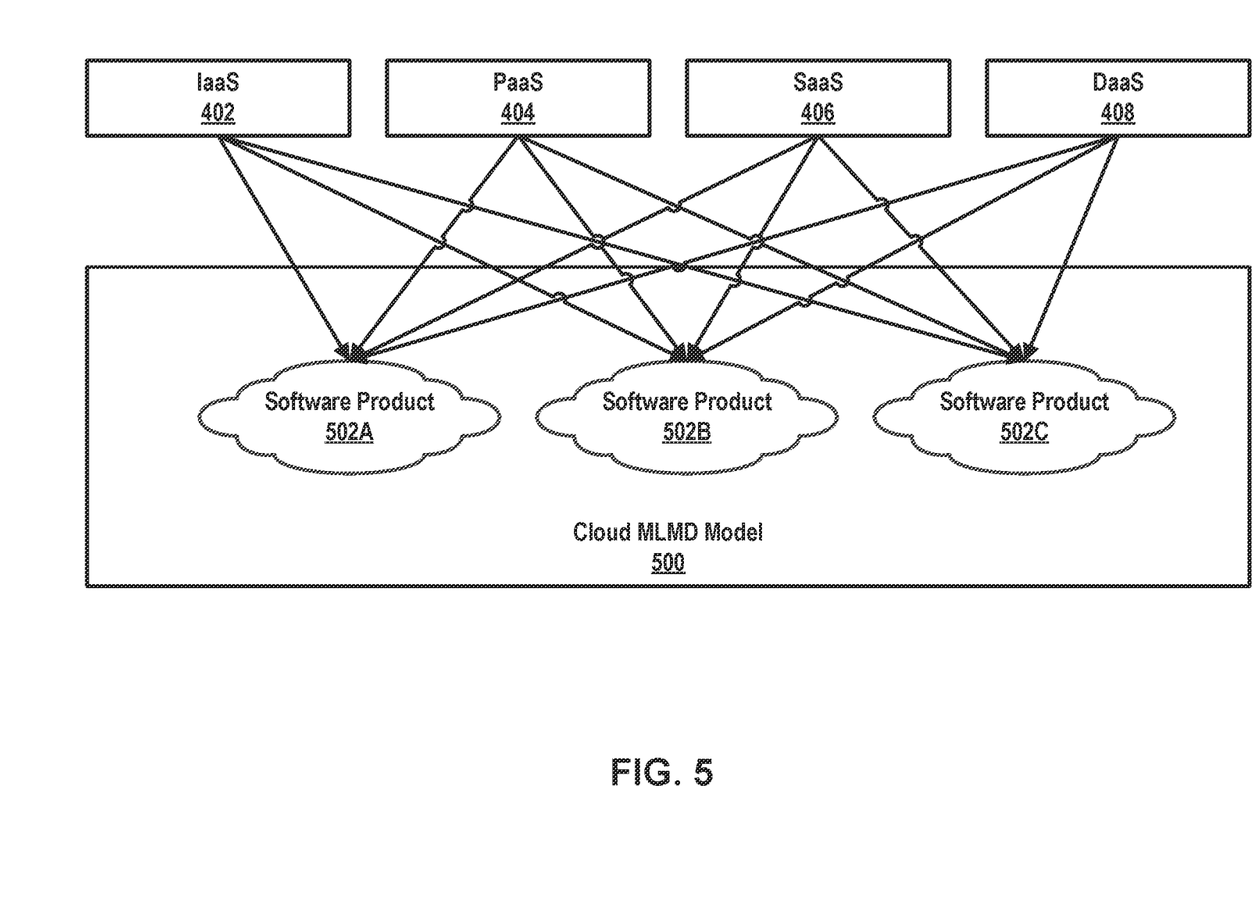
FIG. 5 is a conceptual diagram illustrating example connections between levels and software products, in accordance with techniques of this disclosure.

FIG. 5 is a conceptual diagram illustrating example connections between levels and software products, in accordance with techniques of this disclosure. FIG. 5 illustrates that a cloud MLMD model 500 may include multiple software products 502A, 502B, and 502C (collectively, "software products 502"). IaaS services 402, PaaS services 404, SaaS services 406, and DaaS services 408 may be used to support each or any of software products 502.

The techniques described in this disclosure may be implemented, at least in part, in hardware, software, firmware or any combination thereof. For example, various aspects of the described techniques may be implemented within one or more programmable processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A method comprising:
   receiving, by a computing system, a request for a new stack that is to comprise a plurality of components of the new stack, wherein the plurality of components of the new stack are at a plurality of levels of the new stack, and wherein the request indicates the plurality of components of the new stack; and
   in response to receiving the request:
      interacting, by the computing system, with a cloud services provider to provision instances of the plurality of components of the new stack, wherein at least one instance of the instances of the plurality of components of the new stack is included in one or more existing stacks hosted by the cloud services provider;
      generating, by the computing system, configuration mapping data that relate the at least one instance of the instances of the plurality of components of the new stack that is included in the one or more existing stacks with the new stack;
      converting, by the computing system, the configuration mapping data to one or more cloud provider-specific models that are specific to the cloud services provider; and
      deploying, by the computing system, the new stack at the cloud services provider based on the one or more cloud provider-specific models such that the new stack is operationally isolated from the one or more existing stacks.

2. The method of claim 1, wherein the plurality of levels includes two or more of an infrastructure as a service (IaaS) level, a Platform as a Service (PaaS) level, and a Software as a Service (SaaS) level.

3. The method of claim 1, wherein the new stack is deployed for use by a first user and the one or more existing stacks are associated with users other than the first user.

4. The method of claim 1, wherein the request includes Uniform Resource Locator (URL) of locations from which containerized software packages for one or more of the plurality of components of the new stack are retrievable.

5. The method of claim 1, wherein:
receiving the request for the new stack comprises receiving, by a service orchestrator of the computing system, the request for the new stack, and
the method further comprises:
   requesting, by the service orchestrator, a cloud provisioner service to provision the instances of the plurality of components of the new stack; and
   requesting, by the service orchestrator, a deployment service to generate the configuration mapping data and initiate deployment of the new stack.

6. The method of claim 5, wherein the deployment service is hosted by the cloud services provider.

7. The method of claim 1, wherein:
the request specifies minimum computing resource requirements of the new stack; and
interacting with the cloud services provider comprises interacting with the cloud services provider to provision a cluster of compute nodes that satisfy the minimum computing resource requirements of the new stack.

8. The method of claim 1, wherein the plurality of components of the new stack includes a database and the configuration mapping data relates a schema generated by the cloud services provider with the new stack.

9. The method of claim 1, wherein the plurality of components of the new stack includes a cluster of nodes managed by a container orchestration system (COS) and provisioning the cluster of nodes causes the cloud services provider to instantiate a new namespace within an existing cluster that hosts one or more of the plurality of components of the new stack.

10. The method of claim 9, wherein the existing cluster supports multiple stacks for a single software product.

11. The method of claim 1, wherein deploying the new stack comprises:
invoking a workflow engine that uses the cloud provider-specific models to communicate with the cloud services provider to configure stack-isolated inter-component communication between the plurality of components of the new stack.

12. A computing system comprising:
one or more processors configured to:
   receive a request for a new stack that is to comprise a plurality of components of the new stack, wherein the plurality of components of the new stack are at a plurality of levels of the new stack, and wherein the request indicates the plurality of components of the new stack; and
   in response to the request:
      interact with a cloud services provider to provision instances of the plurality of components of the new stack, wherein at least one instance of the instances of the plurality of components of the new stack is included in one or more existing stacks hosted by the cloud services provider;
      generate configuration mapping data that relate the at least one instance of the instances of the plurality of components of the new stack that is included in the one or more existing stacks with the new stack;
      convert the configuration mapping data to one or more cloud provider-specific models that are specific to the cloud services provider; and
      deploy the new stack at the cloud services provider based on the one or more cloud provider-specific models such that the new stack is operationally isolated from the one or more existing stacks.

13. The computing system of claim 12, wherein the plurality of levels includes two or more of an infrastructure as a service (IaaS) level, a Platform as a Service (PaaS) level, and a Software as a Service (SaaS) level.

14. The computing system of claim 12, wherein the new stack is deployed for use by a first user and the one or more existing stacks are associated with users other than the first user.

15. The computing system of claim 12, wherein the one or processors are configured to execute a service orchestrator configured to:
receive the request for the new stack;
request a cloud provisioner service to provision the instances of the plurality of components of the new stack; and
request a deployment service to generate the configuration mapping data and initiate deployment of the new stack.

16. The computing system of claim 15, wherein the deployment service is hosted by the cloud services provider.

17. The computing system of claim 12, wherein:
the request specifies minimum computing resource requirements of the new stack; and
the one or more processors are configured to interact with the cloud services provider to provision a cluster of compute nodes that satisfy the minimum computing resource requirements of the new stack.

18. The computing system of claim 12, wherein the plurality of components of the new stack includes a database and the configuration mapping data relates a schema generated by the cloud services provider with the new stack.

19. The computing system of claim 12, wherein the plurality of components of the new stack includes a cluster of nodes managed by a container orchestration system (COS) and provisioning the cluster of nodes causes the cloud services provider to instantiate a new namespace within an existing cluster that hosts one or more of the plurality of components of the new stack.

20. The computing system of claim 19, wherein the existing cluster supports multiple stacks for a single software product.

* * * * *